United States Patent
Chen

(10) Patent No.: US 9,250,026 B2
(45) Date of Patent: Feb. 2, 2016

(54) HEAT EXCHANGER AND METHOD FOR FABRICATING THE SAME

(71) Applicant: INVENTEC CORPORATION, Taipei (TW)

(72) Inventor: Chien-An Chen, Taipei (TW)

(73) Assignee: INVENTEC CORPORATION, Taipei (TW)

( * ) Notice: Subject to any disclaimer, the term of this patent is extended or adjusted under 35 U.S.C. 154(b) by 266 days.

(21) Appl. No.: 13/797,138

(22) Filed: Mar. 12, 2013

(65) Prior Publication Data

US 2013/0240194 A1   Sep. 19, 2013

(30) Foreign Application Priority Data

Mar. 16, 2012   (TW) .............................. 101109181 A

(51) Int. Cl.
| | |
|---|---|
| B23P 15/26 | (2006.01) |
| F28F 3/02 | (2006.01) |
| F28F 3/04 | (2006.01) |
| F28F 3/12 | (2006.01) |
| B23C 3/00 | (2006.01) |
| B23C 3/30 | (2006.01) |
| B21D 31/02 | (2006.01) |
| B21D 53/02 | (2006.01) |

(52) U.S. Cl.
CPC . *F28F 3/02* (2013.01); *F28F 3/048* (2013.01); *F28F 3/12* (2013.01); *B21D 31/02* (2013.01); *B21D 53/022* (2013.01); *B23C 3/00* (2013.01); *B23C 3/30* (2013.01); *B23P 15/26* (2013.01); *Y10T 29/4935* (2015.01); *Y10T 409/303752* (2015.01)

(58) Field of Classification Search
CPC ....... B23P 15/26; F28F 225/12; F28F 225/16; F28F 3/02; F28F 3/042; F28F 3/048; F28F 3/12; F28F 13/06; F28F 2215/08; F28F 2215/12; F28F 2215/00; Y10T 29/4935; Y10T 29/49366; Y10T 29/49389
USPC ................................................. 165/80.4, 80.5
See application file for complete search history.

(56) References Cited

U.S. PATENT DOCUMENTS

| | | | | |
|---|---|---|---|---|
| 3,106,014 | A * | 10/1963 | Brick et al. ................... | 228/118 |
| 5,309,983 | A * | 5/1994 | Bailey .......................... | 165/80.3 |
| 6,422,307 | B1 * | 7/2002 | Bhatti et al. .................. | 165/185 |
| 7,219,719 | B2 * | 5/2007 | Gerard .......................... | 165/166 |
| 2012/0014066 | A1 * | 1/2012 | Morino et al. ................ | 361/707 |
| 2012/0227952 | A1 * | 9/2012 | Yoshihara et al. ............ | 165/185 |

FOREIGN PATENT DOCUMENTS

WO   WO 2011061779 A1 *   5/2011

* cited by examiner

*Primary Examiner* — Christopher Besler
(74) *Attorney, Agent, or Firm* — Locke Lord LLP; Tim Tingkang Xia, Esq.

(57) ABSTRACT

A heat exchanger comprises a base portion and a plurality of fins. The fins are disposed on the base portion in parallel along a processing direction. Each fin has a processing surface far away from the base portion. The processing surfaces sunken to form at least one groove, and the groove extends along a grooving direction which intersects with the processing direction. Furthermore, each fin has two upper valley sides at the groove, and the two upper valley sides connect the processing surface. The two upper valley sides and the processing surface form an obtuse angle. The structure of the heat exchanger can prevent processing waste filling in the passages between fins.

6 Claims, 13 Drawing Sheets

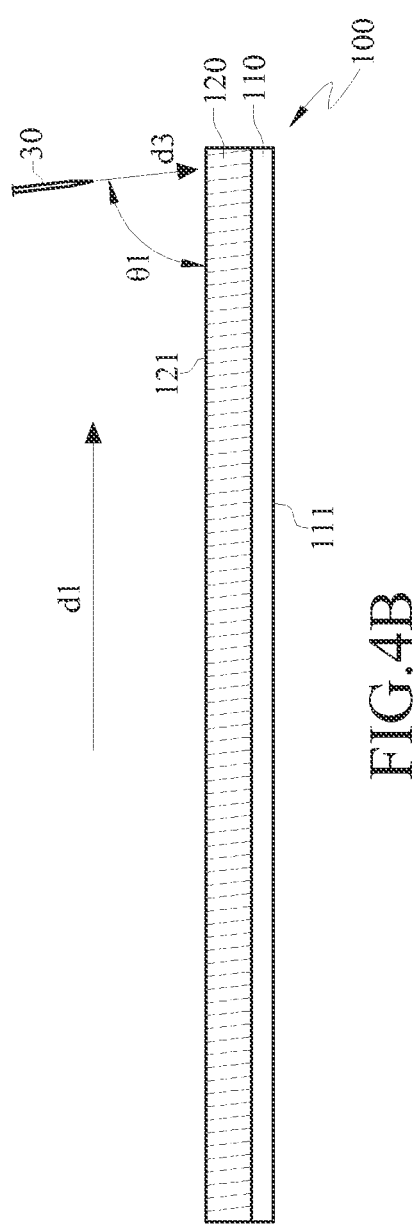
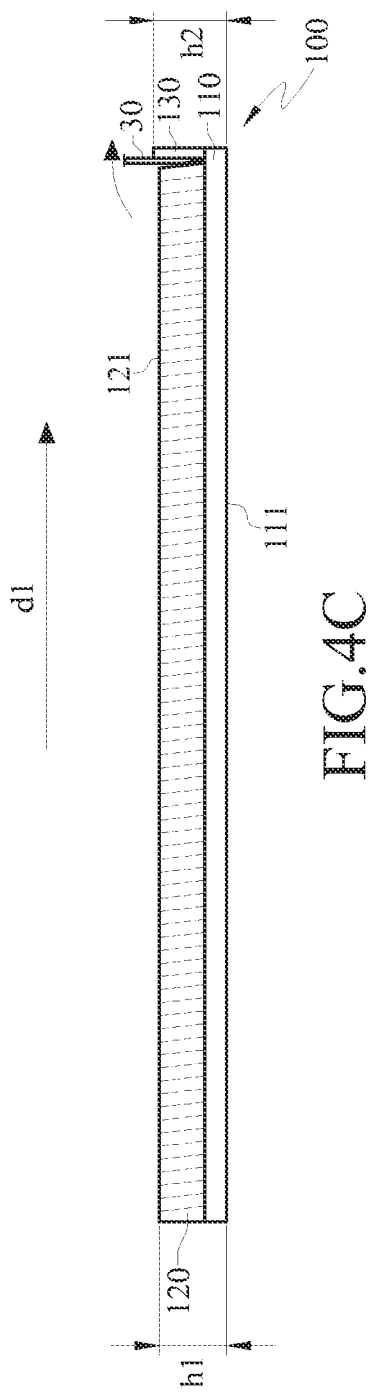
FIG.4B
FIG.4C

HEAT EXCHANGER AND METHOD FOR FABRICATING THE SAME

CROSS-REFERENCE TO RELATED APPLICATIONS

This non-provisional application claims priority under 35 U.S.C. §119(a) on Patent Application No(s). 101109181 filed in Taiwan, R.O.C, on Mar. 16, 2012, the entire contents of which are hereby incorporated by reference.

BACKGROUND OF THE INVENTION

1. Technical Field of the Invention

The disclosure relates to a heat exchanger and method for fabricating the heat exchanger, and more particularly to a heat exchanger having a plurality of fins and method for fabricating the heat exchanger.

2. Description of the Related Art

A heat dissipation module for a cabinet server often uses air-cooling heat dissipation mode. The operation of air-cooling heat dissipation is to set heat dissipation fins on various heat sources and to set corresponding heat dissipation fans in the casing of the cabinet server. The heat convection forced by the heat dissipation fans can dissipate heat generated by the heat sources. In this heat dissipation manner, the environmental temperature of the casing is very high because after the airflow brought by the heat dissipation fans takes way heat, the environmental temperature will be increased. Therefore, during the heat dissipation for the cabinet server, the directions for dissipating heat needed to be uniformed so that a cold channel and a hot channel are formed to control the environmental temperature. If environmental temperature of equipment room is not well controlled, it is very difficult to decrease the temperature of the cabinet server. With area of the equipment room getting larger, the density of servers is getting much greater. The design and management of environmental temperature, cold channel and hot channel become increasingly complicated.

The liquid-cooling heat dissipation module provides another manner for dissipating heat. The liquid-cooling heat dissipation module does not use air to decrease temperature, and thus it will not have the shortcomings of the air-cooling heat dissipation. The liquid-cooling heat dissipation module comprises a cooling device and a cooling pipe connecting the cooling device. The cooling device and the cooling pipe are disposed on the cabinet. The cooling pipe is connected to a heat exchanger for a heat source. The heat exchanger has a chamber, in which a plurality of heat dissipation fins are set. Multiple passages are formed between these fins. The cooling liquid provided by the cooling device flows to the heat exchanger through the cooling pipe, and flows through the passages in the heat exchanger. The cooling liquid performs heat exchange with the fins when flowing through the passages. In this manner, the heat absorbed by the fins can be taken away by the cooling liquid.

However, when cutting the upper margin of these fins, cutting waste is easily filled in the passages. Furthermore, part of the cooling liquid will gasify to be smaller bubbles. It is difficult to get rid of these bubbles if the cutting waste is filled in the passages. In other words, the cutting waste filled in the passages may block the cooling liquid flowing and thus influences the heat dissipation efficiency.

SUMMARY OF THE INVENTION

In one aspect, a method for fabricating a heat exchanger is disclosed. The method comprises providing a substrate comprising a base portion and a processing portion on the base portion, and the processing portion having at least one groove extending along a grooving direction. The processing portion is skived for standing a plurality of fins arranged in parallel along the grooving direction, and the groove passes through each fin. The plurality of fins are milled along a processing direction for making a distance between a processing surface of each fin and a bottom surface of the base portion be smaller than or equal to a preset value, wherein the processing direction intersects with the grooving direction, and the processing surface is far away from the base portion.

In another aspect, a heat exchanger is disclosed. The heat exchanger comprises a base portion and a plurality of fins disposed on the base portion in parallel along a processing direction. Each fin has a processing surface which is disposed on one side of the fin far away from the base portion. The processing surfaces are sunken to form at least one groove, and the groove extends along a grooving direction which intersects with the processing direction. Furthermore, each fin has two upper valley sides at the groove. Two upper valley sides connect the processing surface, and the two upper valley sides and the processing surface form an obtuse angle.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
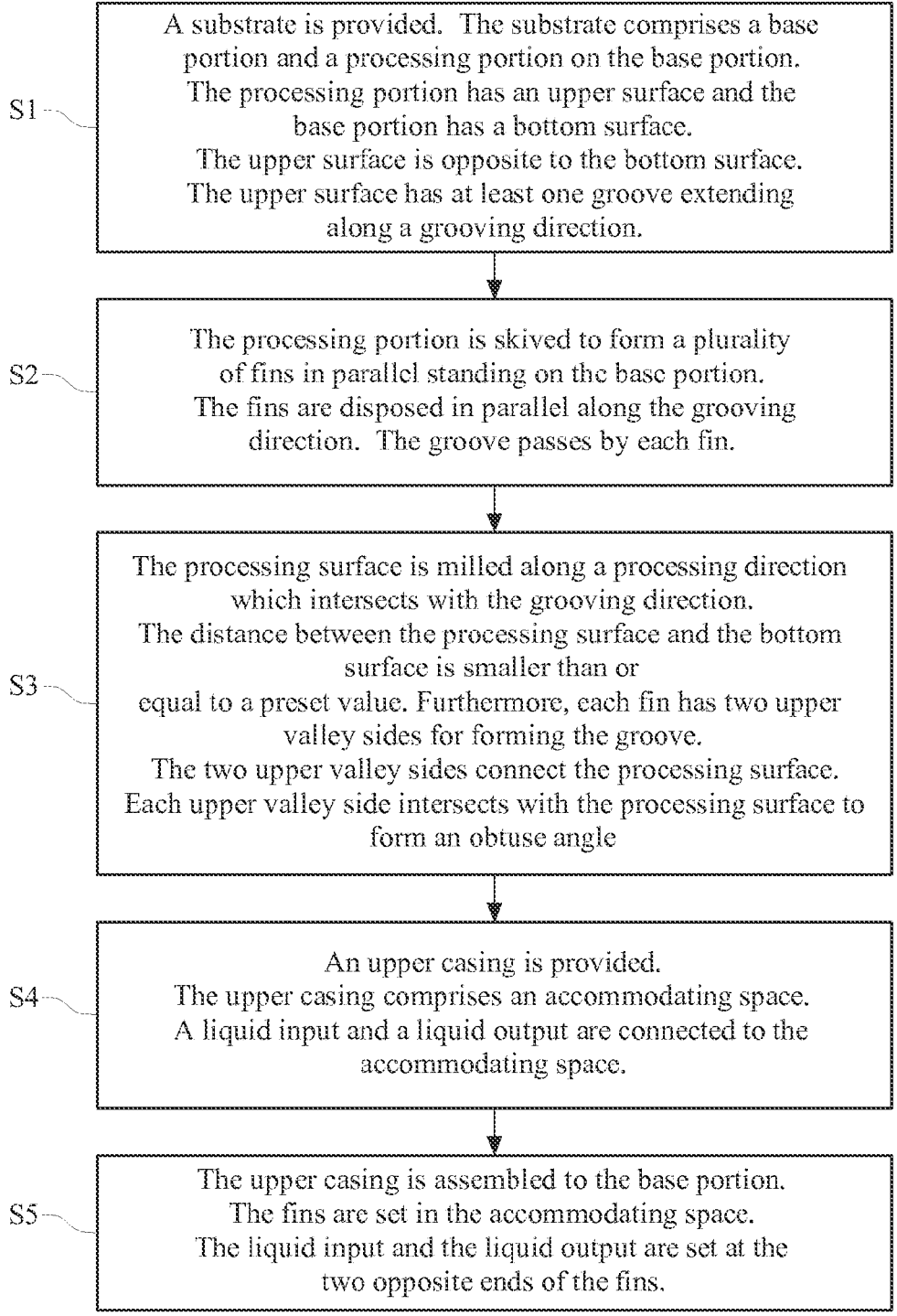
FIG. 1 is a flowchart for fabricating a heat exchanger according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The detailed characteristics and advantages of the disclosure are described in the following embodiments in details, the techniques of the disclosure can be easily understood and embodied by a person of average skill in the art, and the related objects and advantages of the disclosure can be easily understood by a person of average skill in the art by referring to the contents, the claims and the accompanying drawings disclosed in the specifications.

FIG. 1 is a flowchart for fabricating a heat exchanger according to an embodiment. In this embodiment, the heat exchanger may be used in a liquid cooling heat dissipation module which is disposed in a cabinet server. The heat exchanger dissipates the heat generated from heat sources in the cabinet server. The fabricating processes for the heat exchanger will be described as below.

Firstly, a substrate is provided. The substrate comprises a base portion and a processing portion on the base portion. The processing portion has an upper surface and the base portion has a bottom surface. That is, the upper surface is opposite to the bottom surface. The upper surface has at least one groove extending along a grooving direction (step S1).

Next, the processing portion is skived to form a plurality of fins in parallel standing on the base portion. The fins are disposed in parallel along the grooving direction. The groove passes through each fin. (step S2).

The fins are milled along a processing direction which intersects with the grooving direction to form a processing surface. The distance between the processing surface and the bottom surface is smaller than or equal to a preset value. Furthermore, each fin has two upper valley sides for forming the groove. The two upper valley sides connect the processing surface. Each upper valley side intersects with the processing surface to form an obtuse angle (step S3).

An upper casing is provided. The upper casing comprises an accommodating space. A liquid input and a liquid output are connected to the accommodating space (step S4).

The upper casing is assembled to the base portion. The fins are set in the accommodating space. Furthermore, the liquid input and the liquid output are set at the two opposite ends of the fins (step S5).

FIGS. 2A-7B show a fabricating process for a heat exchanger according to an embodiment. The detailed process is set forth as below.

Figure 2A:
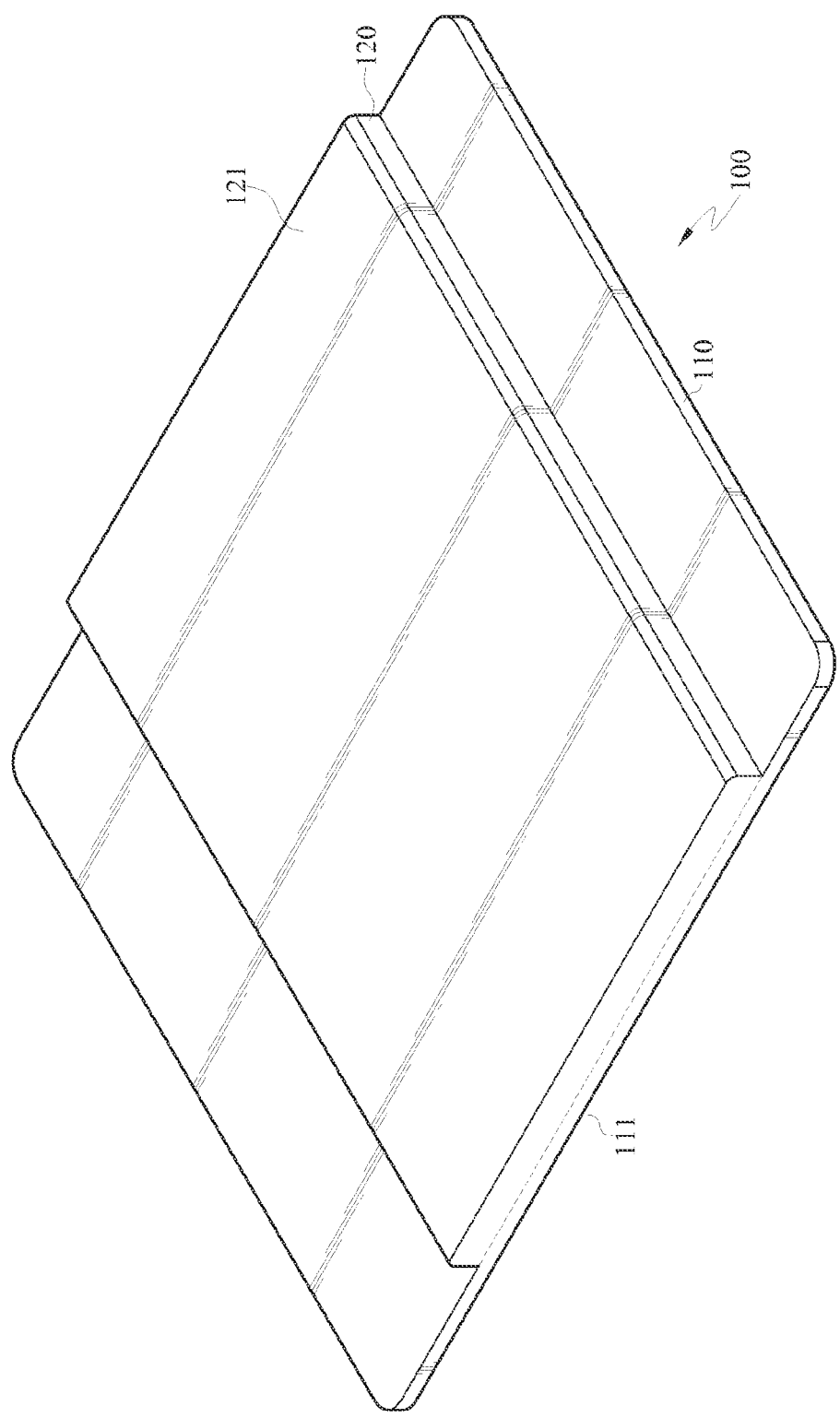
FIGS. 2A-7B show a fabricating process for a heat exchanger according to an embodiment of the disclosure.
Figure 2B:
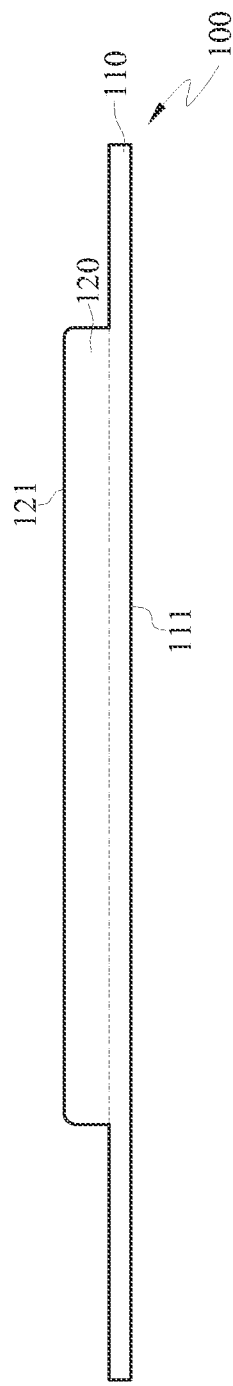
Figure 3:
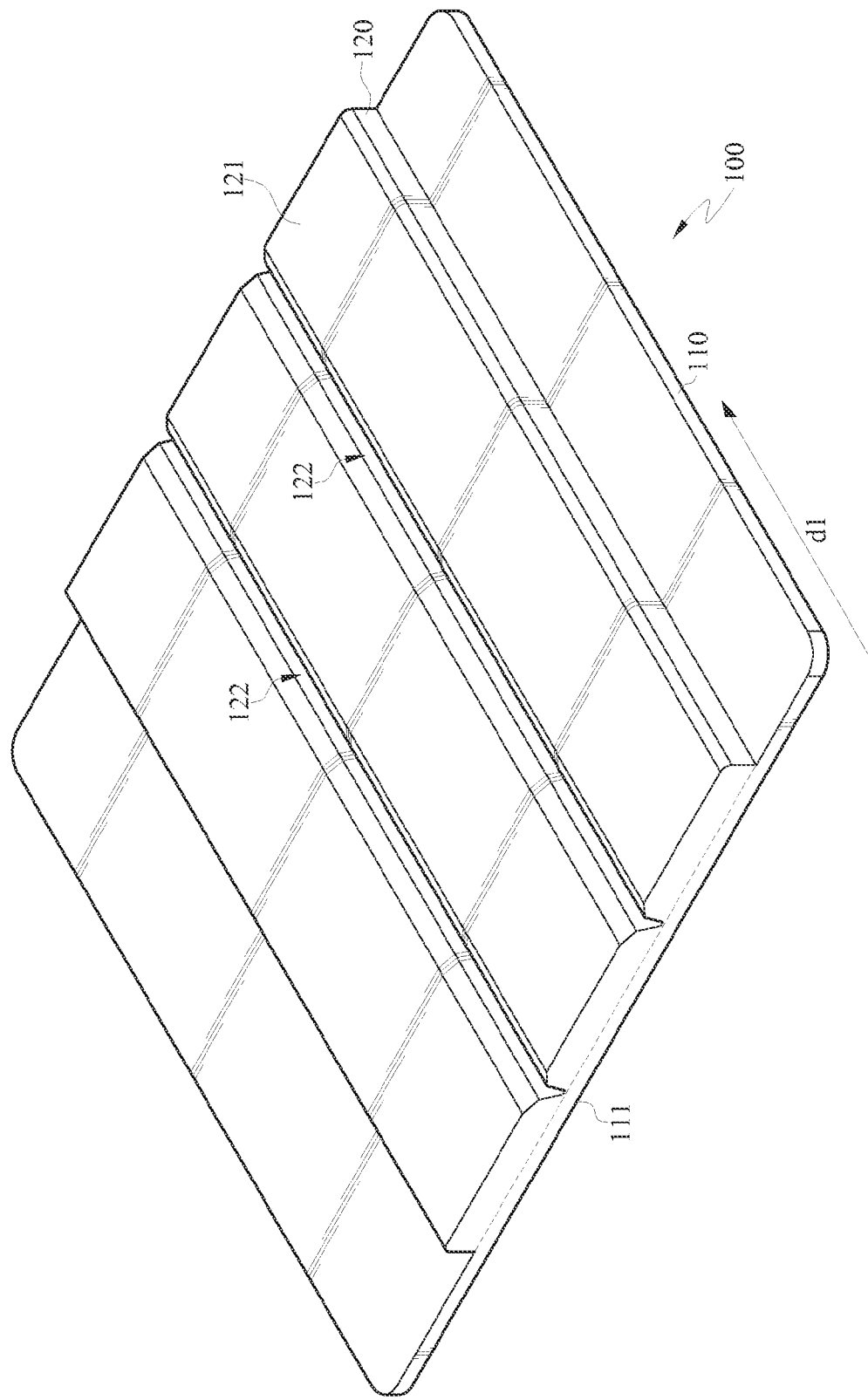

Firstly, as shown in FIG. 2A, the substrate 100 is provided. The substrate 100 can be made of but not limited to metal, such as aluminum alloy. The substrate 100 can be made by aluminum extrusion, but the disclosure is not limited this way. The substrate 100 comprises a base portion 110 and a processing portion 120 on the base portion 110. As shown in FIG. 2B, the processing portion 120 has an upper surface 121 and the base portion 110 has a bottom surface 111. The upper surface 121 is opposite to the bottom surface 111. Furthermore, as show in FIG. 3, the upper surface 121 has at least one groove 122 extending along the grooving direction d1. The groove 122 may be formed together with the substrate 100 by aluminum extrusion. Alternatively, the substrate 100 is firstly formed by aluminum extrusion, and the groove 122 is formed by milling. FIG. 3 shows two grooves 122, but the number of the groove is not limited.

Figure 4A:
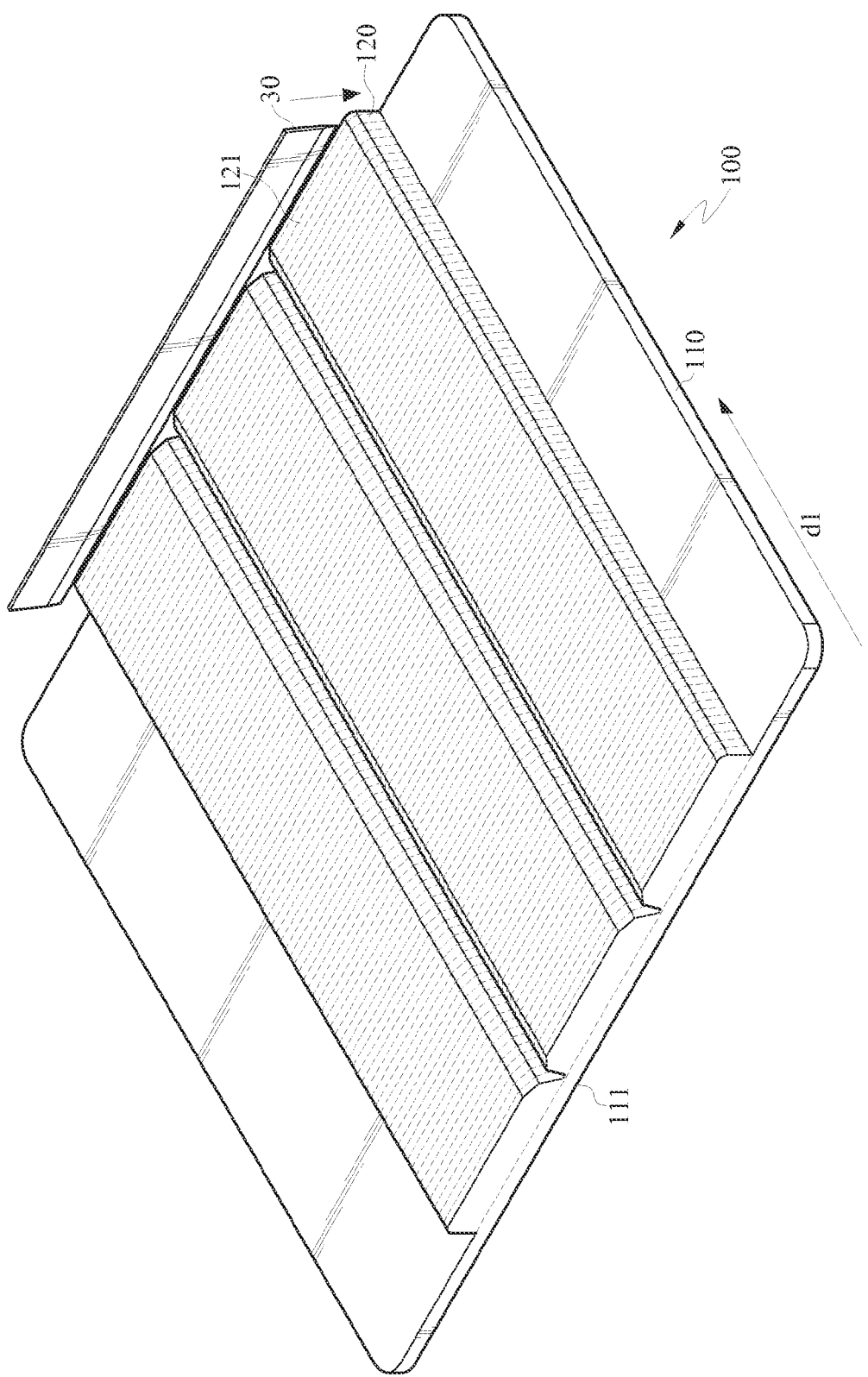

Next, the processing portion 120 is skived to form a plurality of fins 130 in parallel standing on the base portion 110. More particularly, as shown in FIGS. 4A-4C, firstly the processing portion 120 is cut by using a knife 30 along the cutting direction d3 so as to form a fin 130. The cutting direction d3 and the upper surface 121 form an acute angle $\theta_1$, as shown by FIG. 4B. Then, the fin 130 is bended to stand on the base portion 110, as shown by FIG. 4C. A plurality of fins 130 are formed in the same way as the above. It can be seen from FIG. 4C that the distance h2 between the highest point of the fins 130 and the bottom surface 111 is greater than the distance h1 between the upper surface 121 and the bottom surface 111. The smaller the acute angle $\theta_1$ is, the larger distance h2 will be. That is, if the acute angle $\theta_1$ is smaller, the height of the fins 130 will be larger. As a result, persons skilled in the art would obtain an expected height of fins 130 by adjusting the acute angle $\theta_1$.

Figure 5A:
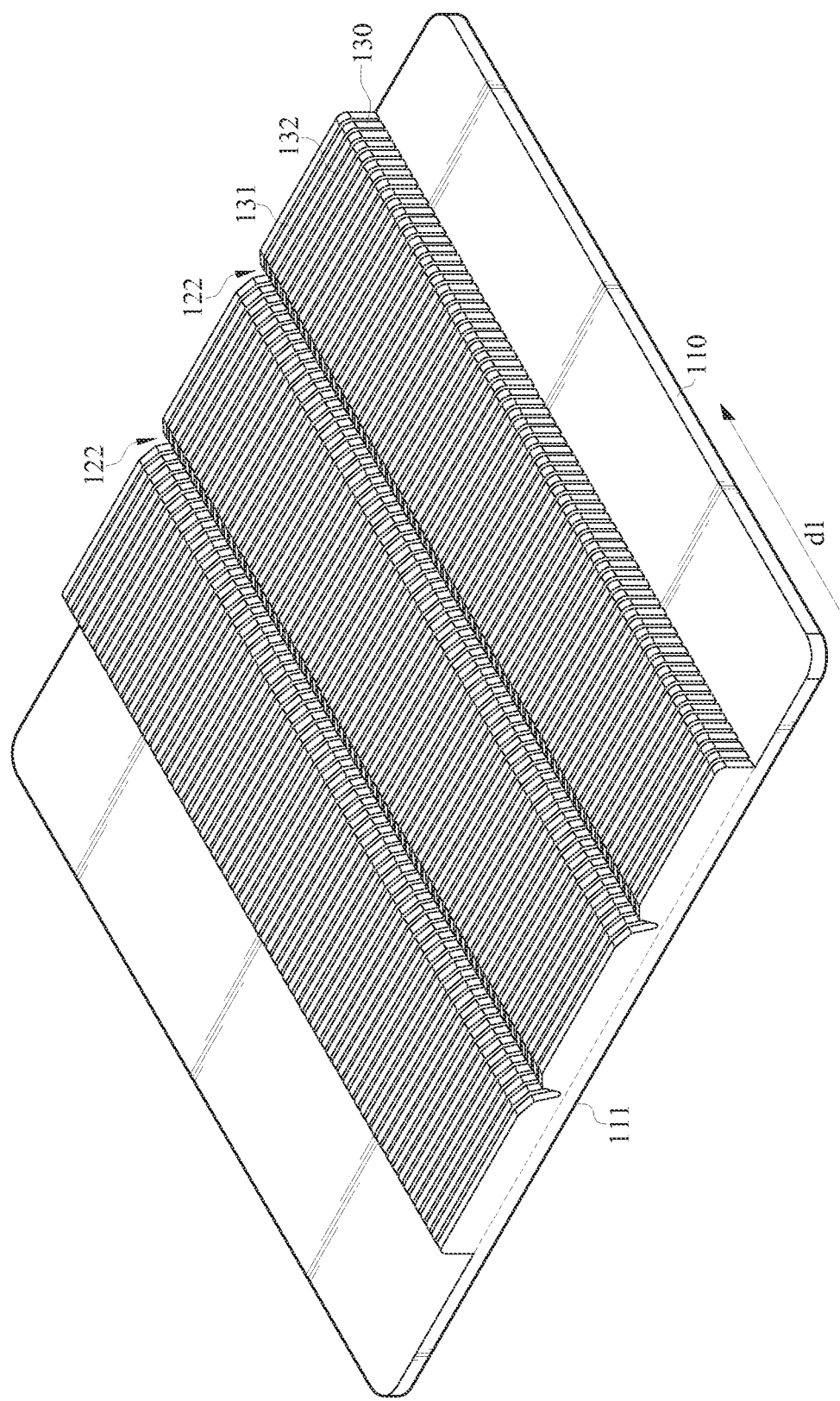
Figure 5B:
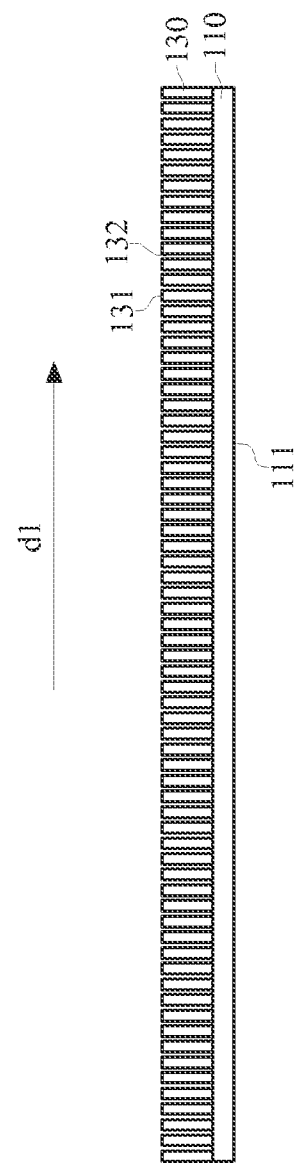
Figure 5C:
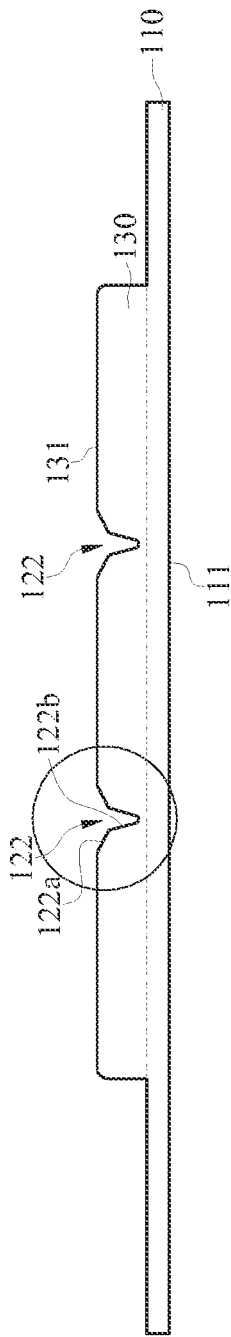
Figure 5D:
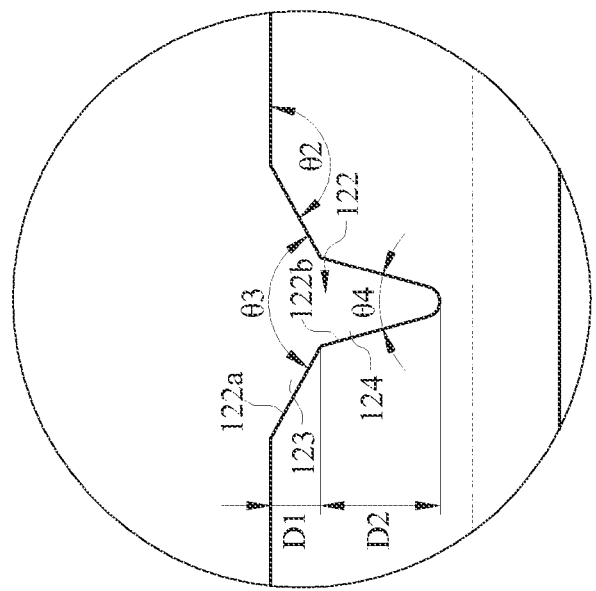

As shown by FIG. 5A, the fins 130 are in parallel along the grooving direction d1. The grooves 122 are extending along the grooving direction d1 and pass through each fin 130. As shown in FIG. 5B, two adjacent fins 130 have a passage 132 therebetween. Each fin 130 has a processing surface 131 far away from the base portion 110 and the processing surface 131 is to be milled. As shown in FIG. 5C, on each side of the passage 132 are the upper valley side 122a and the lower valley side 122b. The two upper valley sides 122a connect the processing surface 131. The upper valley side 122a and the processing surface 131 form a obtuse angle $\theta_2$ as shown in FIG. 5D. In this way, a steep slope can be prevented on the processing surface 131 when forming the groove 122. Because of the structure of upper valley side 122a and the lower valley side 122b, chances for the waste during milling going into the groove 122 can be reduced. In addition, the lower valley side 122b extends from one end of the upper valley side 122a to the base portion 110, and the upper valley side 122a is between the processing surface 131 and the lower valley side 122b. Also referring to FIG. 5D, an angle $\theta_3$ is formed between two upper valley sides 122a, and an angle $\theta_4$ is formed between two lower valley sides 122b. The angle $\theta_3$ is greater than the angle $\theta_4$. Actually, the angle $\theta_3$ is formed when two upper valley sides 122a extend to the base portion. In particular, if the angle $\theta_3$ is bigger (i.e., the angle $\theta_2$ is bigger), when milling the processing surface131, it is more difficult to accumulate the processing waste in the fins 130. Furthermore, the fins 130 may have more heat dissipation area if the angle $\theta_3$ is bigger. In the other hand, considering the same opening width of the groove 122, if the angle $\theta_3$ is bigger, the depth of the groove 122 is smaller. As a result, the groove 122 will not be formed at the bottom of the groove 122. The bubbles at the bottom of the groove 122 cannot be removed and thus the heat dissipation efficiency will be influenced. Therefore, considering the heat dissipation and reducing accumulation of processing waste, in this embodiment, angles $\theta_3$ and $\theta_4$ are determined to reduce the accumulation of processing waste and remove the bubbles between the fins 130. As such, desired heat dissipation efficiency can be obtained.

With reference to FIG. 5D, in this embodiment, the groove 122 comprises a first groove 123 formed by two upper valley sides 122a and a second groove 124 formed by two lower valley sides 122b. The depth D1 of the first groove 123 is smaller than the depth D2 of the second groove 124. In other words, the first groove 123 with bigger opening width can be designed a smaller depth D1. The second groove 124 with smaller opening width can be designed a bigger depth D2. The reasons for designing the depth D1 smaller than the depth D2 are the same as the above. That is, according to this depth design, a bigger heat dissipation area and desired heat dissipation efficiency can be obtained when reducing the accumulation of processing waste.

Figure 6A:
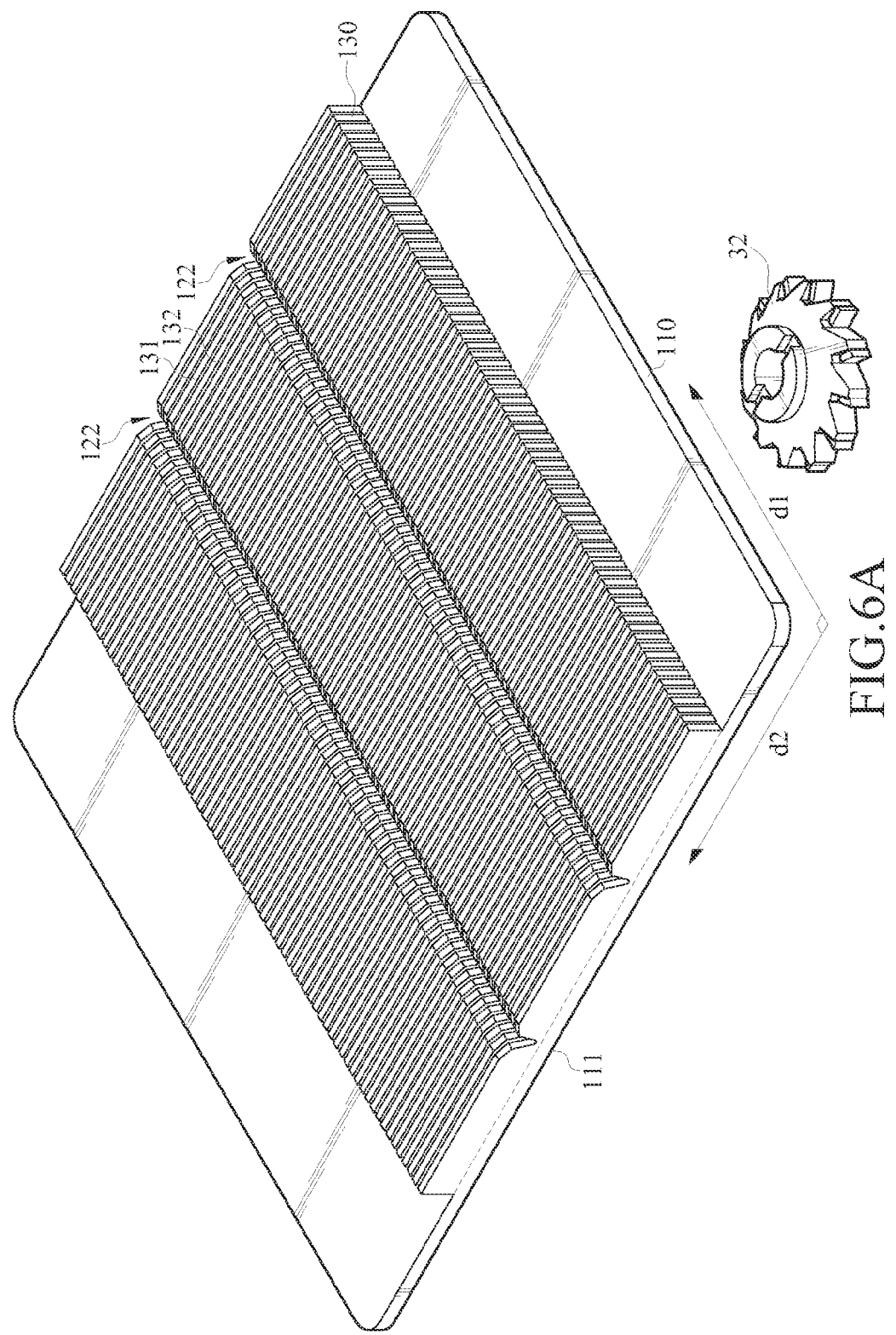
Figure 6B:
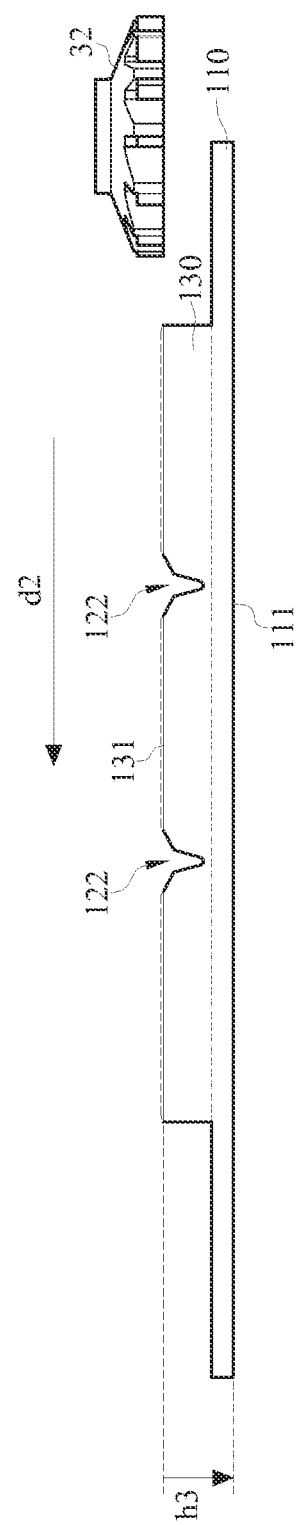

With reference to FIGS. 6A and 6B, the fins 130 are milled by a knife 32 along the direction d2 which intersects with the direction d1. The maximum distance between the processing surface 131 and the bottom surface 111 is smaller than or equal to a preset value h3, where the value h3 may be determined according to different requirements. In this way, the height of the fins 130 can be controlled within a certain range to avoid interference with other elements (e.g. the upper casing 200 in FIG. 7A) when assembly. In addition, here the direction d2 is not exactly perpendicular to the direction d1. Under appropriate processing errors, the angle between the direction d1 and the direction d2 is regarded as a right angle.

In this embodiment, the obtuse angle $\theta_2$ is formed between the upper valley side 122a and the processing surface 131, so that a steep slope can be prevented at the processing surface 131 when forming the groove 122. In such a case, when cutting the fins 130 along the direction d2, the cutting waste is easily removed from the passages 132.

Figure 7A:
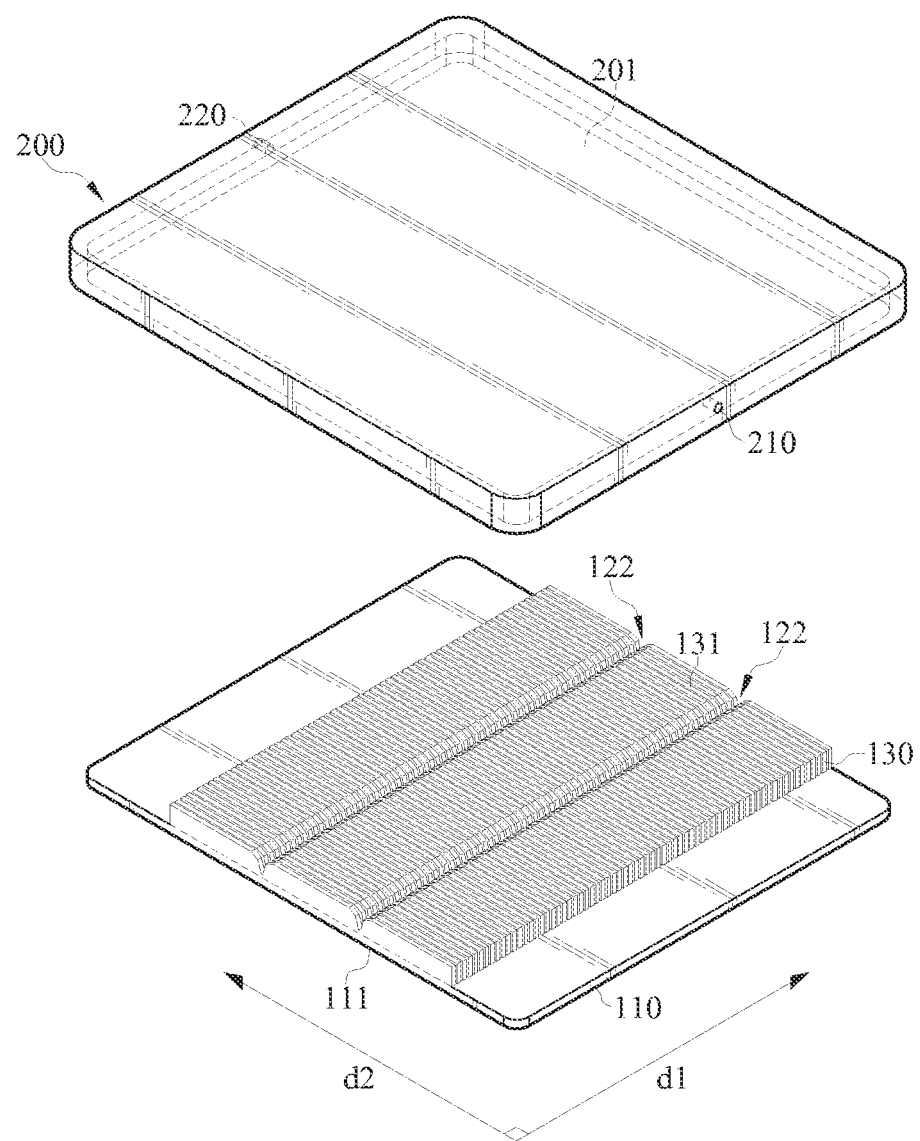
FIG. 7C shows a fabricating process for a heat exchanger according to another embodiment of the disclosure.

With reference to FIG. 7A, an upper casing 200 is provided. The upper casing 200 comprises an accommodating space 201. A liquid input 210 and a liquid output 220 are connected to the accommodating space 201.

Figure 7B:
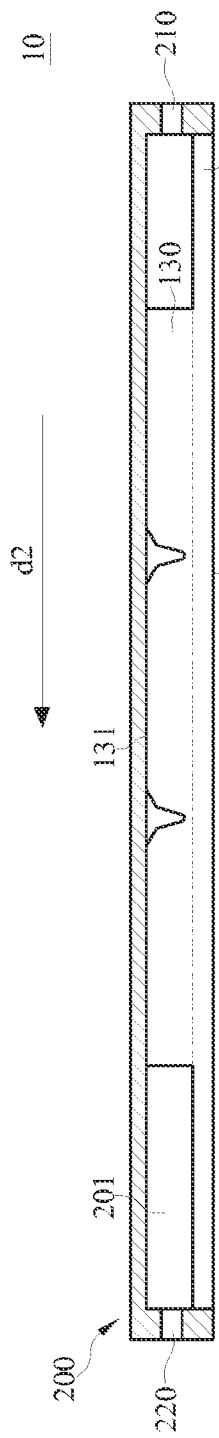
Figure 7C:
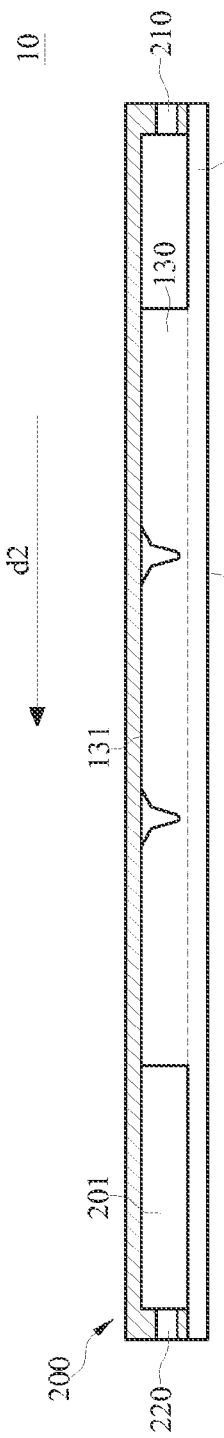

The upper casing 200 is assembled to the base portion 110. The fins 130 are in the accommodating space 201. As shown in FIG. 7B, the liquid input 210 and the liquid output 220 are at the opposite two ends of the fins 130. The upper casing 210 completely covers the base portion 110, but the disclosure is not limited this way. For example, as shown in FIG. 7C, the upper casing 200 can be disposed on the base portion 110 and partly covers the base portion 110.

In this embodiment, the upper casing 200 may be assembled to the base portion 110 by soldering, but the disclosure is not limited this way. In this embodiment, the processing surface 131 is substantially attached to the upper casing 200 so that better heat dissipation efficiency can be achieved. The term "substantially" means due to processing errors the processing surface 131 may be approximately attached to the upper casing 200. When the cooling liquid comes into the accommodating space 201 from the liquid input 210, that the processing surface 131 is substantially tightly attached to the upper casing 200 avoids a gap from which the cooling liquid flows away. Without the gap between the processing surface 131 and the upper casing 200, the cooling liquid can sufficiently contact with the fins 130 to prevent reducing heat dissipation efficiency.

With reference to FIGS. 7A and 7B, the heat exchanger 10 may be fabricated by the above mentioned process. The heat exchanger 10 comprises the base portion 110 and a plurality of fins 130. The base portion 110 has the bottom surface 111. The fins 130 are disposed in parallel on the side far away from the bottom surface 111. Each fin 130 has a processing surface 131 far away from the base portion 110. The processing surfaces 131 are cut to form at least one groove 122. Each groove 122 extends along the grooving direction d1. The upper valley side 122a connects the processing surface 131, and they form an obtuse angle.

In addition, in this embodiment, the heat exchanger 10 further includes an upper casing 200. The upper casing 200 comprises an accommodating space 201. A liquid input 210 and a liquid output 220 are connected to the accommodating space 201. The upper casing 200 is assembled to the base portion 110. The fins 130 are in the accommodating space 201. The liquid input 210 and the liquid output 220 are set at two opposite ends of the fins 130. The processing surface 131 is substantially attached to the upper casing 200.

Figure 8:
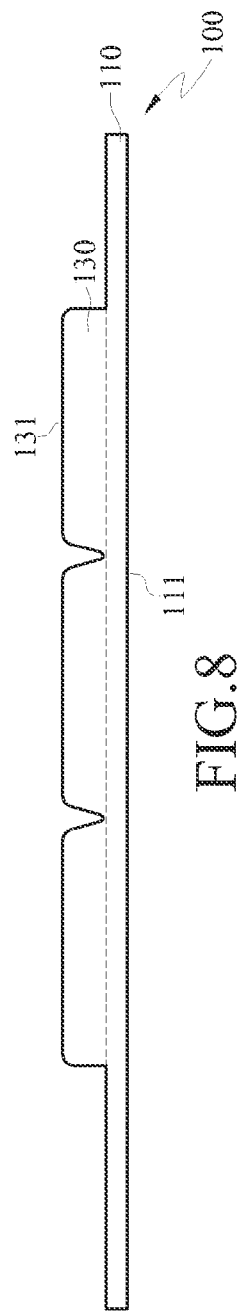
FIG. 8 is a structure illustration of a heat exchanger according to another embodiment of the disclosure.

With reference to FIG. 8, FIG. 8 is a structure illustration of a heat exchanger according to another embodiment. In other embodiments, the groove 122 may only comprise two upper valley sides 122a which connect to the processing surface 131 and form an obtuse angle with the processing surface 131. However, the disclosure is not limited by these embodiments.

According to the above embodiments of the heat exchangers and method for fabricating the heat exchangers, the processing surfaces sunken to form grooves. The upper valley side of a groove and the processing surface form an obtuse angle. When cutting fins along a processing direction, the cutting waste can be easily removed and does not stuff the passage between fins. Furthermore, small bubbles brought by cooling liquid can be easily removed and thus the heat dissipation efficiency can be improved.

What is claimed is:

1. A method for fabricating a heat exchanger, comprising:
   providing a substrate, the substrate comprising a base portion and a processing portion on the base portion, the processing portion having at least one groove extending along a grooving direction;
   skiving the processing portion for standing a plurality of fins arranged in parallel along the grooving direction, the groove passing through each fin; and
   milling the plurality of fins along a processing direction for making a distance between a processing surface of each fin and a bottom surface of the base portion being smaller than or equal to a preset value, wherein the processing direction intersects with the grooving direction, and the processing surface is far away from the base portion,
   wherein the groove has two upper valley sides and two lower valley sides, the two upper valley sides connect the processing surface, each of the two upper valley sides forms an obtuse angle with the processing surface, one end of each of the two lower valley sides connects to corresponding one of the two upper valley sides, each of the two upper valley sides is between corresponding one of the two lower valley sides and the processing surface, the two upper valley sides form a first angle, the two lower valley sides form a second angle, and the first angle is greater than the second angle.

2. The method according to claim 1, wherein after the step of milling the plurality of fins the method further comprises:
   providing an upper casing, the upper casing having an accommodating space, the accommodating space is connected to a input and a output; and
   assembling the upper casing to the base portion, setting the plurality of fins in the accommodating space, the liquid input and the liquid output are disposed at opposite two ends of the plurality of fins, the plurality of processing surfaces are substantially attached to the upper casing.

3. The method according to claim 1, wherein the step of skiving the processing portion further comprises:
   cutting the processing portion along a direction which forms an acute angle with an upper surface of the processing portion to form a fin, wherein the base portion has a bottom surface, and the upper surface of the processing portion is opposite to the bottom surface; and
   bending the fin to make it stand on the base portion.

4. The method according to claim 1, wherein the groove has a first groove located between the two upper valley sides and a second groove located between the two lower valley sides, the depth of the first groove is smaller than the depth of the second groove.

5. The method according to claim 1, wherein the substrate is fabricated by aluminum extrusion.

6. The method according to claim 1, wherein the processing direction is substantially perpendicular to the grooving direction.

* * * * *